United States Patent Office 3,234,242
Patented Feb. 8, 1966

3,234,242
PRODUCTION OF 4:4'-DIAMINO-1:1'-DIANTHRA-QUINONYL SULFONIC ACIDS
Max Jost, Basel, Walter Kern, Sissach, and Maurice Grelat, Basel, Switzerland, assignors to Ciba Limited, Basel, Switzerland, a Swiss company
No Drawing. Filed Apr. 27, 1961, Ser. No. 105,876
Claims priority, application Switzerland, May 5, 1960, 5,131/60
4 Claims. (Cl. 260—367)

The present invention is based on the observation that 4:4'-diamino-1:1'-dianthraquinonyl compounds can be obtained in a simple manner by heating a 1-amino-4-halogenanthraquinone-2-sulfonic acid in an acid in an acid medium with metallic copper or with a copper compound capable of splitting off halogen and that, if desired, in the 4:4'-diamino - 1:1'-dianthraquinonyl - 3:3'-disulfonic acid so obtained the sulfonic acid groups may be replaced by hydrogen atoms or other substituents, or may be converted into other substituents. As 1-amino-4-halogen-anthraquinone-2-sulfonic acids there may be used, for example, 1-amino-4-chloro-anthraquinone-2-sulfonic acid, 1-amino-4-bromo-6- or 7-chloro-anthraquinone-2-sulfonic acid, 1-amino-4-bromo-6:7-dichloro-anthrapinone-2-sulfonic acid, 1-amino-4-bromo-anthraquinone-2:6-disulfonic acid, 1 - amino-4-bromo-nitro-anthraquinone - 2 - sulfonic acid, but especially 1-amino-4-bromo-anthraquinone-2-sulfonic acid (so called bromamic acid).

There may be used advantageously an excess of copper, that is to say more than the theoretical necessary amount of one atomic proportion per molecular proportion of bromamic acid, thus, at least 1.2, advantageously at least two atomic proportions of copper to one molecular proportion of bromamic acid. The copper is advantageously in powder form in which the average particle size preferably does not exceed 25µ. In the course of the reaction copper compounds may be formed, especially in the presence of excess copper, which are themselves capable of splitting off halogen.

From the amounts of copper given above it is not to be understood that with smaller quantities of copper the reaction is practically inoperable. For practical purposes it is advisable to use a certain excess, but smaller quantities of less than one molecular proportion of copper still yield the desired product, particularly when the quantity of acid used is somewhat reduced and the reaction time prolonged. The yield of end product is, however, smaller, so that any economy effected in the price of the copper is squared by a diminished yield. The most favorable conditions consequently differ according to prices.

The condensation may be effected by heating in an acid medium, for example, in water or in a water-miscible organic solvent as, for example, alcohol, acetone, glycol monoethyl ether, dimethyl formamide or dioxane to which a strong acid or a strongly acid reaction salt has been added, advantageously at a temperature within the range of 50 to 100° C. The pH-value of the aqueous solution advantageously lies between 2 and 5. The acid reaction can be produced by addition of a strong acid, especially a mineral acid, for example, sulfuric acid, hydrochloric acid, phosphoric acid, trichloro-acetic acid, or an acid reacting salt, for example, potassium hydrogen sulfate, copper sulfate, aluminum sulfate, copper nitrate, or an organic sulfonic acid as, for example, benzene sulfonic acid, para-toluene sulfonic acid or naphthalene sulfonic acid.

The 4:4'-diamino-1:1'-dianthraquinonyl-3:3'-disulfonic acids are precipitated in good yield and purity, advantageously by addition of an alkali metal salt, especially sodium chloride, to the aqueous solution, in which case the products will be in the form of the sodium salt.

The sulfonic acids obtained by the process of the invention, for example, 4:4'-diamino-1:1'-dianthraquinonyl-3:3'-4:4'-diamino-6:6'- or 7:7'-dichloro-1:1'-dianthraquinonyl-3:3'-disulfonic acid, or 4:4'-diamino-6:6':7:7'-tetrachloro-1:1'-dianthraquinonyl-3:3'-disulfonic acid or 4:4' - diamino - 1:1'-dianthraquinonyl - 3:3':7:7'-tetrasulfonic acid are valuable dyestuffs which are capable of dyeing different materials, for example, animal fibers as, for example, wool. Their salts, for example, the calcium, strontium, barium, nickel, copper, cobalt and chromium salts, also serve as pigments.

The sulfonic acid groups that are in ortho-position to the amino groups in the diamino-dianthraquinonyl sulfonic acids obtainable by the process of the invention may be exchanged for hydrogen atoms or other substituents. The substitution by hydrogen atoms can advantageously be effected by heating the disulfonic acid with a mineral acid, especially with up to 90% strength sulfuric acid at a temperature in the range of 120 to 220° C. The use of 80 to 90% strength sulfuric acid has proved to be advantageous since the splitting off of the sulfonic acid groups already occurs at temperatures from 120° C. and without the use of pressure. Salts which show an acidic reaction in aqueous solution, such, for example, as sodium bisulfate, may also be used instead of a mineral acid for the splitting off of sulfonic acid groups.

The 4:4'-diamino-dianthraquinonyls obtainable in very good yield and high purity by splitting off of the sulfonic acid groups, for example, 4:4'-diamino-6:6'- or 7:7'-dichloro-1:1'-dianthraquinonyl, 4:4'-diamino-6:6':7:7'-tetrachloro-1:1'-dianthraquinonyl and especially 4:4'-diamino-1:1'-dianthraquinonyl, are valuable pigments which owing to their outstanding fastness qualities are suitable for the usual pigment applications.

Instead of exchanging the sulfonic acid groups in the 3:3'-positions for hydrogen atoms they may be exchanged for halogen atoms. Thus, there may be obtained, for example, in good yield by treating 4:4'-diamino-1:1'-dianthraquinonyl-3:3'-disulfonic acid with bromine in an aqueous acid medium, for example, in aqueous hydrobromic acid, 4:4'-diamino-3:3'-dibromo-1:1'-dianthraquinonyl which also exhibits valuable pigment properties.

The following examples illustrate the invention, the parts and percentages being by weight and the temperatures being in ° C.

*Example 1*

40.4 parts of the sodium salt of 1-amino-4-bromo-anthraquinone-2-sulfonic acid, 19.1 parts of copper powder, 600 parts of water and 5 parts of sulfuric acid of 50% strength are heated for 1½ hours to 75° while stirring vigorously. The mixture is thereupon rendered alkaline by adding sodium carbonate, heated for 5 minutes to boiling point and filtered in the hot state. 13 parts of sodium chloride are added to the filtrate in the hot state and the mixture is allowed to cool while stirring. The precipitated sodium salt of diaminodianthraquinonyldisulfonic acid is filtered and washed with sodium chloride solution of 2% strength; the salt can be purified by dissolving it in hot water, clarifying it with active carbon and separating it with 2% sodium chloride. The yield of the dried sodium salt of 4:4'-diamino-1:1'-dianthraquinonyl-3:3'-disulfonic acid is 92% of the theoretical, taking the sodium chloride content into consideration.

Instead of sulfuric acid, copper sulfate, copper nitrate, p-toluenesulfonic acid or naphthalenesulfonic acid can be used with similar results.

The copper powder employed should be as finely divided as possible. Copper powder the particles of which exceed a diameter of about 25µ are less suitable for the reaction.

Example 2

40.4 parts of the sodium salt of 1-amino-4-bromo-anthraquinone-2-sulfonic acid, 19.1 parts of copper powder and 10 parts of crystallized p-toluenesulfonic acid are kept at 75 to 78° for 15 hours with 240 parts of 95% alcohol while stirring vigorously. The suspension obtained is filtered off and the filtered material is mixed, after washing with alcohol, in 1000 parts of water and gradually rendered alkaline with sodium carbonate at boiling temperature. The suspension is now filtered clear and 20 parts of sodium chloride are added to the hot filtrate. On cooling, the sodium salt of 4:4'-diamino-1:1'-dianthraquinonyl-3:3'-disulfonic acid is precipitated, the yield being 86%.

Example 3

26.9 parts of the potassium salt of 1-amino-4-bromo-anthraquinone-2:6-disulfonic acid are stirred vigorously with 9.6 parts of copper powder, 600 parts of water and 1.25 parts of sulfuric acid of 100% strength for 1½ hours at 75° C. The suspension is rendered alkaline with potassium carbonate and filtered clear while boiling. 65 parts of potassium sulfate are added to the filtrate (800 parts) and the mixture is allowed to cool. The precipitated deposit is filtered off, washed with 5% potassium sulfate solution and purified by crystallization from a little water with separation of difficulty soluble by-products. The potassium salt of 4:4' - diamino - 1:1' - dianthraquinonyl-3:3':7:7'-tetrasulfonic acid dyes wool from an acid bath in shades of red.

Example 4

24.45 parts of the potassium salt of 1-amino-4-bromo-6:7-dichloroanthraquinone-2-sulfonic acid, 9.6 parts of copper powder, 600 parts of water and 1.25 parts of sulfuric acid of 100% strength are stirred vigorously for 2 hours at 90 to 95° C. The mixture is thereupon diluted with 1400 parts of water, and in the hot state 30 parts of sodium carbonate are added thereto. The suspension is allowed to cool and the precipitate is filtered off and washed once more with cold water. By extracting the filtration residue with 4000 parts of water and precipitation with 80 parts of sodium chloride a crude product is obtained which can be purified by dissolving it once more and separating a difficultly soluble by-product. The sodium salt of 4:4'-diamino-6:6':7:7'-tetrachloro-1:1'-dianthraquinonyl-3:3'-disulfonic acid dyes wool strong Bordeaux-colored shades.

Example 5

32.4 parts of a sodium salt of 4:4'-diamino-1:1'-dianthraquinonyl-3:3'-disulfonic acid are added to 240 parts of sulfuric acid of 80% strength heated to 110° C. The mixture is thereupon heated for 3 hours to 135 to 140° C. The solution, which is cooled to 60° C., is poured on to ice water. The precipitated deposit is filtered off and washed until it is neutral. To remove the last traces of acid, the moist product is stirred vigorously once more in water for some time with the addition of 0.5 part of sodium hydroxide. The 4:4'-diamino-1:1'-dianthraquinonyl is finally filtered off once more, washed thoroughly with water and dried at 60° C. 21.1 parts=95% of the theoretical, of the pigment are obtained in a form suitable for incorporation in varnishes and synthetic resins.

Example 6

32.4 parts of the sodium salt of 4:4'-diamino-1:1'-dianthraquinonyl-3:3'-disulfonic acid are heated with 880 parts of sulfuric acid of 5% strength to 195 to 200° C. for 10 hours in an acid-resistant pressure vessel while stirring. The cooled suspension is filtered, the precipitate is washed with water until it is neutral and dried. 20.4 parts=92% of the theoretical of 4:4'-diamino-1:1'-dianthraquinonyl are obtained.

Example 7

32.4 parts of the sodium salt of 4:4'-diamino-1:1'-dianthraquinonyl-3:3'-disulfonic acid are heated with 324 parts of sulfuric acid of 2.5% strength to 175 to 180° C. for 7 hours in an acid-resistant pressure vessel while stirring. The cooled suspension is filtered, the precipitate is washed with water until it is neutral and dried. 20.8 parts=94% of the theoretical of 4:4'-diamino-1:1'-dianthraquinonyl are obtained.

Example 8

3 parts of the sodium salt of 4:4'-diamino-1:1'-dianthraquinonyl-3:3'-disulfonic acid are heated in an acid-resistant pressure reaction vessel with 60 parts of hydrochloric acid of 5% strength for 7 hours to 180 to 190° C. The 4:4'-diamino-1:1'-dianthraquinonyl is obtained in excellent yield.

Phosphoric acid of 10% strength may be employed instead of hydrochloric acid with the same results.

If the hydrochloric acid is replaced by a 5% sodium hydrogen sulfate solution and the mixture is heated for 15 hours to 195 to 200° C., the same result is obtained.

Example 9

3 parts of the product obtained in accordance with Example 3 are heated with 60 parts of sulfuric acid of 5% strength in an acid and pressure-resistant reaction vessel for 10 hours to 190 to 200° C. The crystals precipitated on cooling are filtered with suction, suspended in 200 parts of water and dissolved at elevated temperature by adding sodium carbonate. By adding 6 parts of sodium chloride, a product differing from the starting material is separated; this product presumably represents the sodium salt of 4:4'-diamino-1:1'-dianthraquinonyl-7:7'-disulfonic acid and dyes wool deep Bordeaux-colored shades.

Example 10

3 parts of the product obtained in accordance with Example 4 are added while stirring to 100 parts of sulfuric acid of 80% strength. The mixture is heated for 1 hour to 150 to 155° C., cooled and poured on to ice water. The 4:4'-diamino - 6:6':7:7' - tetrachloro-1:1'-dianthraquinonyl obtained is excellently suitable for coloring varnishes and synthetic resin masses. This dye, blended with titanium dioxide colors PVC a subdued red-violet.

Example 11

64.8 parts of the sodium salt of 4:4'-diamino-1:1'-dianthraquinonyl-3:3'-disulfonic acid are dissolved in 3250 parts of water while stirring and heating. The mixture is cooled to 30° C. and a solution of 38 parts of bromine in 300 parts of hydrobromic acid of 50% strength are added thereto in the course of 10 minutes. After stirring for 4 hours at 40 to 45° C., the precipitate formed is filtered off and washed with water until it is neutral. After drying, 56 parts=93% of the theoretical, of 4:4'-diamino-3:3'-dibromo-1:1'-dianthraquinonyl are obtained.

Example 12

40.4 parts of the sodium salt of 1-amino-4-bromo-anthraquinone-2-sulfonic acid, 12.7 parts of copper powder, 600 parts of water and 3.3 parts of sulfuric acid of 50% strength are heated for 6 hours at 75° C. while stirring vigorously. Working up as described in Example 1 gives the sodium salt of 4:4'-diamino-1:1'-dianthraquinonyl-3:3'-disulfonic acid, the yield being 91%.

Example 13

40.4 parts of the sodium salt of 1-amino-4-bromo-anthraquinone-2-sulfonic acid, 7.65 parts of copper powder, 600 parts of water and 2 parts of sulfuric acid of 50% strength are heated for 12 hours at 75° C. while stirring vigorously. The product obtained by working up the reaction mixture as described in Example 1 is purified by being dissolved in 1000 parts of hot water, clarification with 4 parts of active carbon and salting out with 20 parts of sodium chloride. The sodium salt of 4:4′-diamino-1:1′-dianthraquinonyl-3:3′-disulfonic acid is obtained in a yield of 88% of the theoretical.

What is claimed is:

1. The process which comprises heating with copper at a temperature within the range of 50–100° C. at a pH of 2–5 a member selected from the group consisting of 1-amino-4-bromo-anthraquinone-2-sulfonic acid, 1-amino-4-bromo-6,7-dichloroanthraquinone-2-sulfonic acid, and 1-amino-4-bromo-anthraquinone-2,6-disulfonic acid in a member selected from the group consisting of water, ethanol, acetone, glycol monoethyl ether, dimethyl formamide and dioxane.

2. A process as claimed in claim 1, wherein for one molecular proportion of the 1-amino-4-halogen-anthraquinone-sulfonic acid there are used at least 1.2 atomic proportions of copper.

3. A process as claimed in claim 1, wherein for one molecular proportion of the 1-amino-4-halogen-anthraquinone-sulfonic acid there are used at least 2 atomic proportions of copper.

4. A process as claimed in claim 1, wherein copper powder is used, preferably having an average particle size not greater than 25μ.

References Cited by the Examiner

FOREIGN PATENTS 25,507     1907    Great Britain.
205,422   12/1908   Germany.

OTHER REFERENCES

Hauben: Die Anthracene und Anthrachinone (1929), pages 280, 297–300, 538.

LORRAINE A. WEINBERGER, *Primary Examiner.*

CHARLES B. PARKER, *Examiner.*